US011219037B2

(12) United States Patent
Agerstam et al.

(10) Patent No.: US 11,219,037 B2
(45) Date of Patent: Jan. 4, 2022

(54) RADIO RESOURCE SCHEDULING

(71) Applicant: Intel Corporation, Santa Clara, CA (US)

(72) Inventors: Mats Gustav Agerstam, Portland, OR (US); Vijay Sarathi Kesavan, Portland, OR (US); Thuyen C Tran, Hillsboro, OR (US); Shilpa A Sodani, Portland, OR (US); Douglas K Hudson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 103 days.

(21) Appl. No.: 16/608,702

(22) PCT Filed: May 9, 2017

(86) PCT No.: PCT/US2017/031772
§ 371 (c)(1),
(2) Date: Oct. 25, 2019

(87) PCT Pub. No.: WO2018/208291
PCT Pub. Date: Nov. 15, 2018

(65) Prior Publication Data
US 2020/0170024 A1    May 28, 2020

(51) Int. Cl.
*H04W 72/12*     (2009.01)
*H04W 84/18*     (2009.01)
*H04W 88/16*     (2009.01)

(52) U.S. Cl.
CPC ..... *H04W 72/121* (2013.01); *H04W 72/1268* (2013.01); *H04W 72/1289* (2013.01); *H04W 84/18* (2013.01); *H04W 88/16* (2013.01)

(58) Field of Classification Search
CPC ............... H04W 72/048; H04W 72/12; H04W 72/1268; H04W 72/1289; H04W 72/121; H04W 88/16; H04W 88/10; H04W 84/18
See application file for complete search history.

(56) References Cited

U.S. PATENT DOCUMENTS 9,210,220 B2 *  12/2015  Steckley ............. H04L 12/2818
2008/0056261 A1   3/2008  Osborn et al.
(Continued)

FOREIGN PATENT DOCUMENTS

WO      2018208291       11/2018
WO   WO-2018208291 A1    11/2018

OTHER PUBLICATIONS

"International Application Serial No. PCT/US2017/031772, International Search Report dated Jan. 26, 2018", 5 pgs.
(Continued)

*Primary Examiner* — Wei Zhao
(74) *Attorney, Agent, or Firm* — Schwegman Lundberg & Woessner, P.A.

(57) ABSTRACT

System and techniques for radio resource scheduling are described herein. A network request may be received at a first network interface of a gateway device. Here, the network request includes an information request to multiple devices connected to the gateway device via a second network interface. A transmission schedule may be created for the multiple devices that is contention free. The transmission schedule may be propagated to the multiple devices. Information responsive to the information request may be received from the multiple devices according to the transmission schedule. The network request may be fulfilled with the information.

24 Claims, 9 Drawing Sheets

(56) References Cited

U.S. PATENT DOCUMENTS

2014/0328199 A1    11/2014  Matischek et al.
2019/0356515 A1*   11/2019  Murakami ............ H04B 7/0456
2019/0372907 A1*   12/2019  Liao ........................ H04L 47/70

OTHER PUBLICATIONS

"International Application Serial No. PCT/US2017/031772, Written Opinion dated Jan. 26, 2018", 9 pgs.

Lee, Junhee, et al., "A multi-channel timeslot scheduling algorithm for link recovery in wireless multi-hop sensor network", 2016 International Conference on Information and Communication Technology Convergence ICTC IEEE, (Oct. 19, 2016), 871-876.

Park, Soohong, "OCF: A New Open IoT Consortium", 31st International Conference on Advanced Information Networking and Applications Workshops (WAINA), IEEE,, (Mar. 27, 2017), 356-359.

"International Application Serial No. PCT US2017 031772, International Preliminary Report on Patentability dated Nov. 21, 2019", 8 pgs.

Lee, Junhee, "A multi-channel timeslot scheduling algorithm for link recovery in wireless multi-hop sensor network", 2016 International Conference on Information and Communication Technology Convergence ICTC IEEE, (Oct. 19, 2016), 871-876.

\* cited by examiner

RADIO RESOURCE SCHEDULING

PRIORITY APPLICATION

This application is a U.S. National Stage Application under 35 U.S.C. 371 from International Application No. PCT/US2017/031772, filed May 9, 2017, published as WO 2018/208291, which is incorporated herein by reference in its entirety.

TECHNICAL FIELD

Embodiments described herein generally relate to wireless networking, and more specifically to radio resource scheduling.

BACKGROUND

The internet-of-things (IoT) refers to devices and communication networks to connect a multitude of devices, many of which were previously unconnected. Examples may include sensor arrays, control systems, appliances, building automation systems, among others. The Open Connectivity Foundation (OCF) is a standards body promulgating communications protocols to facilitate a variety of IoT deployments. The OCF family of standards defines application layer communication endpoints, object (e.g., data) definitions, discovery and security procedures to allow the exchange of data between IoT devices and services.

A variety of techniques may be used to provide the physical layer connectivity of IoT deployments. Although wired techniques, such as Ethernet, are possible. IoT deployments generally employ wireless technologies to ease deployment placements and costs. An example wireless technology used in some IoT deployments operates in accordance with an IEEE 802.15.4 family of standards. This technology allows for a variety of efficient (e.g., low power) self-organizing networks. IEEE 802.15.4e is a variation permitting high device deployment densities, which allows for dense sensor networks to support the next generation of connected systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As noted above, the IEEE 802.15.4e standard facilitates sensor dense sensor deployments due to the scaling possible with time slot channel hopping (TSCH) used to schedule communications. However, IEEE 802.15.4e scheduling choices and implementation specific. What is needed is a technique to schedule the leaf to root (e.g., upwards) communication paradigm of a IEEE 802.15.4c network to facilitate an OCF—or other connectivity standard—client (e.g., consumer device) to leverage the clear semantics around discovery, connectivity, data modeling, and security provided by OCF or other application layer protocols. In an example, the scheduling will support an observe (e.g., subscription) pattern whereby the client subscribes to events and is alerted when such an event occurs. In such patterns, the schedule may be tailored to reflect reporting patterns to reduce network traffic or power requirements for IEEE 802.15.4e nodes (e.g., motes). Although it is possible for motes to individually implement the OCF stack for direct communications with OCF clients, resource requirements may be reduced by using an OCF intermediary (e.g., gateway, bridge, etc.) to implement the OCF stack while also serving as an IEEE 802.15.4e coordinator at a root of the IEEE 802.15.4e network tree. In this configuration, the OCF intermediary may:

a) identify a set of motes relevant to an OCF client subscription request—this may include identifying the type of sensor and any filter or query criteria provided by the OCF client;

b) generate an optimized TSCH schedule that enables each mote (e.g., sensor) to periodically communicate state changes (e.g., changes in data generated by a sensor) without contention. Further, the schedule and behavior of the motes may be designed to aggregate mote data or mote transmissions individual branches of the IEEE 802.15.4 tree; and c) modify IEEE 802.15.4e parameters, such as the objective function, slot frame size, etc., based on mote resources to increase reliability of the 802.15.4 network Additional details and examples are described below.

Figure 1:
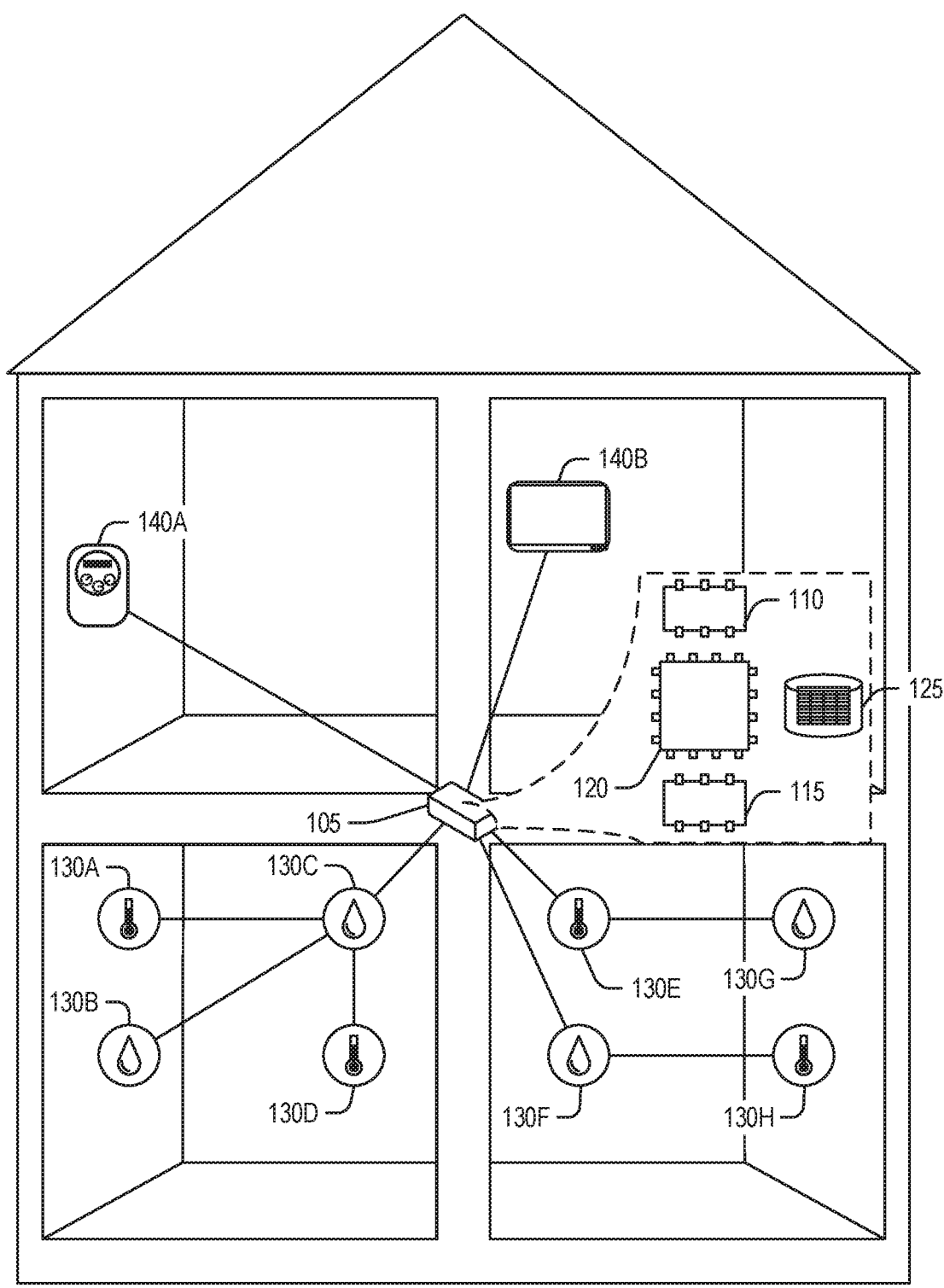
FIG. 1 illustrates an example of an environment including a system for radio resource scheduling, according to an embodiment.

FIG. 1 is a block diagram of an example of an environment including a system 105 for radio resource scheduling, according to an embodiment. The system 105 may include circuitry 120, a first network interface 110, and a second network interface 115. The components of the system 105 are implemented in computer hardware such as that described below. The system 105 may be termed a gateway (e.g., intermediary, bridge) device.

The processing circuitry 120 is arranged to receive a network request from the first network interface 110 that, in operation, is connected to a first network. In an example, the first network operates in accordance with an OCF family of standards. The first network may include OCF clients 140, such as a home automation control panel 140B or a remote monitor 140A (e.g., a utility meter, security system, etc.). Thus, the OCF clients 140 may communicate to the system 105 using OCF conventions.

In an example, the network request includes an information request. The information request may include a query for temperature, humidity, motion, etc. from one or more sensors. In an example, the information request is directed to multiple devices 130 connected to the system 105 via the second network interface. In an example, the network request is an OCF observe request. OCF generally operates via a request response paradigm in which the OCF client makes a request via a URI on an OCF server. In this embodiment, to keep abreast of state changes in a sensor, the OCF client 140 would poll the sensor. The observe pattern modifies this behavior by including a callback URI and a criterion as part of the initial request. The OCF server accepts these additional parameters and, when a state change meets the criterion, the OCF server uses the callback URI to contact the OCF client and deliver the results. The observe pattern reduces network traffic and communication burdens on the participating devices. In an example, the observe request specifies at least one of a type or location. Here, type refers to at least one of device type or data type. For example, a device type may be "thermometer" while a data type may be "temperature". Using device types or data types allows a communication abstraction to increase flexibility in underlying deployments. For example, a fire detector device type may provide temperature data. To an OCF client wanting temperature data, the observe request may specify a data type of "temperature" that is ultimately fulfilled by the fire detector without even if the OCF client did not anticipate interacting with a fire detector. Location designates a physical or logical grouping of devices. Example physical locations may include a building designation, a floor designation, a room designation, a city, a county, etc. Logical designations may include a functional grouping, such as lighting, heating-and-cooling, etc. The location may include a combination of logical and physical components, such as lighting on the fifth floor. In the observe request specifying type or location of devices, the multiple devices correspond to the type or the location of the observe request.

In an example, the second network interface 115, when in operation, connects to a second network that operates in accordance with an IEEE 802.15.4e family of standards, employing TSCH. TSCH changes the conventionally contention based radio access of IEEE 802.11 or IEEE 802.15.4 wireless connection technologies by scheduling a channel and time in which motes 130 communicate. Thus, the schedule 125 would assign a first channel and time slot combination to the thermometer mote 130A and a second channel and time slot combination to the hygrometer mote 130B. Accordingly, in an example, to create the transmission schedule 125, the processing circuitry 120 is arranged to assign the multiple devices a respective channel and time slot.

In an example, the processing circuitry 120 is arranged to define a new topology for the second network. The new topology facilitates fulfilling the OCF client 140 request. For example, if the request was for humidity and temperature from one of the left-most room, the illustrated topology indicates that there may be contention through the mote 130C for the thermometer motes 130A and 130D regardless of which hygrometer motes 130C or 130B produces the humidity data. In this example, reforming the topology such that mote 130A or 130D connects directly to the system 105 may reduce network contention to fulfill the request. In an example, the new topology flattens a connectivity tree of the second network. Thus, for example, the new topology may have the mote 130D connect directly to the system 105 instead of using mote 130C as its parent. After the new topology is created by the processing circuitry 120, the new topology may be transmitted to nodes in the second network.

IEEE 802.15.4e is a self-organizing network that forms a tree topology. A device acting as a coordinator uses IPv6 Routing Protocol for Low-Power and Lossy Networks (RPL) to organize the motes 130. As part of RPL, an objective function may be transmitted to the motes 130. The motes 130 use the objective function to evaluate parent node options and select a single parent for the mote 130. Because each mote 130 has a single parent that lead to the coordinator, a tree is formed. By changing the objective function, the topology of the second network may also be changed. Thus, in an example, to transmit the topology to the second network, the processing circuitry 120 is arranged to transmit an objective function to the nodes 130. Again, the objective function takes network metrics of reachable nodes as an input and ranks the reachable nodes. A node executing the objective function may select a highest rank reachable node from the objective function output as a parent node. In an example, the objective function prioritizes power source and ranks power constrained devices lower. This last point helps to lessen the burden on devices that may, for example, operate on battery power. As every parent must be operational to forward the communications of a child, a battery-operated parent may expend its limited power transmitting messages rather than operating as a sensor, for example.

The processing circuitry 120 is arranged to create the transmission schedule 125 for the multiple devices that is contention free. As used herein, "contention free" means that the scheduled devices will not compete (e.g., interfere) with each other for radio resources when transmitting data. Although topology modifications may be beneficial the power of TSCH allows contention to be avoided by dividing the radio resources in frequency and time between motes 130. For example, taking the OCF client request for temperature and humidity, the motes 130A may be assigned a first channel and the mote 130C a second channel in the same time slot, or different time slots in the same channel, and not interfere with each other. In an example, a channel and time slot for a given device in the multiple devices is assigned based on the given device position in the second network. In an example, network branches on a same level of the second network are assigned different channels. Thus, as each parent must forward the communications of its children, parents at the same level may simultaneously communicate through frequency diversity. In an example, the same level is a level that directly connects to the gateway device. Here, the only branches that are assigned a different channel are those that originate from the gateway. For example, three branches originate from the system 105, one to mote 130C, one to mote 130E, and one to mote 130F. Each of these motes 130 may be assigned a different channel. However, motes 130A, 130B, and 130D, although branches from mote 130C, would be assigned the same channel.

In an example, network levels on a same branch of the second network are assigned different time slots. Thus, continuing the example from above, motes 130A, 103B, 130D, and 130C may be assigned different time slots. In an example, a level a first distance from the system 105 is assigned an earlier time slot than a level at a second distance. Here, the first distance is greater than the second distance. In an example, distance is measured by intervening devices (e.g., hops) in the second network. These last examples help to optimize communications because the intervening nodes route child traffic. Thus, if the children are assigned early timeslots (e.g., transmit first), the parent nodes do not have to be awake (aside from receiving a transmission) during the child transmission time slot. The parent may then wake to transmit the child data as well as its own.

In an example, a second level device (e.g., parent) aggregates transmissions from first level devices. In an example, to aggregate the transmissions, the second level device aggregates data in the transmissions by combining the data into a new dataset. Data aggregation may take many forms but always involves combining data. A simple data aggregation may simply concatenate child data with parent data. More complex aggregation schemes may include recording differences of the child data from the parent data, summing, averaging, or otherwise combining the parent and child data. In an example, to aggregate the transmissions, the second level device combines the transmissions into a collection and transmits the collection to the gateway device. Aggregating transmissions or data results in greater network efficiency and often power savings for participating devices.

The processing circuitry 120 is arranged to propagate the transmission schedule 125 to the multiple devices. Thus, the system 105 communicates (e.g., via RPL) the transmission schedule 125 to the motes 130. Once the transmission schedule 125 (and possibly a topology modification) are communicated, the motes 130 of the second network may efficiently provide data to the system 105 to respond to the OCF clients 140. Thus, the processing circuitry 120 is arranged to receive information, responsive to the information request, from the multiple devices according to the transmission schedule 125. The processing circuitry 120 is also arranged to fulfilling the network request with the information. In this way, the system 150 bridges an OCF network with an IEEE 802.15.4e network, increasing efficiency (e.g., bandwidth, power use, etc.) by using knowledge of the OCF request and the capabilities of the IEEE 802.15.4e network.

Figure 2:
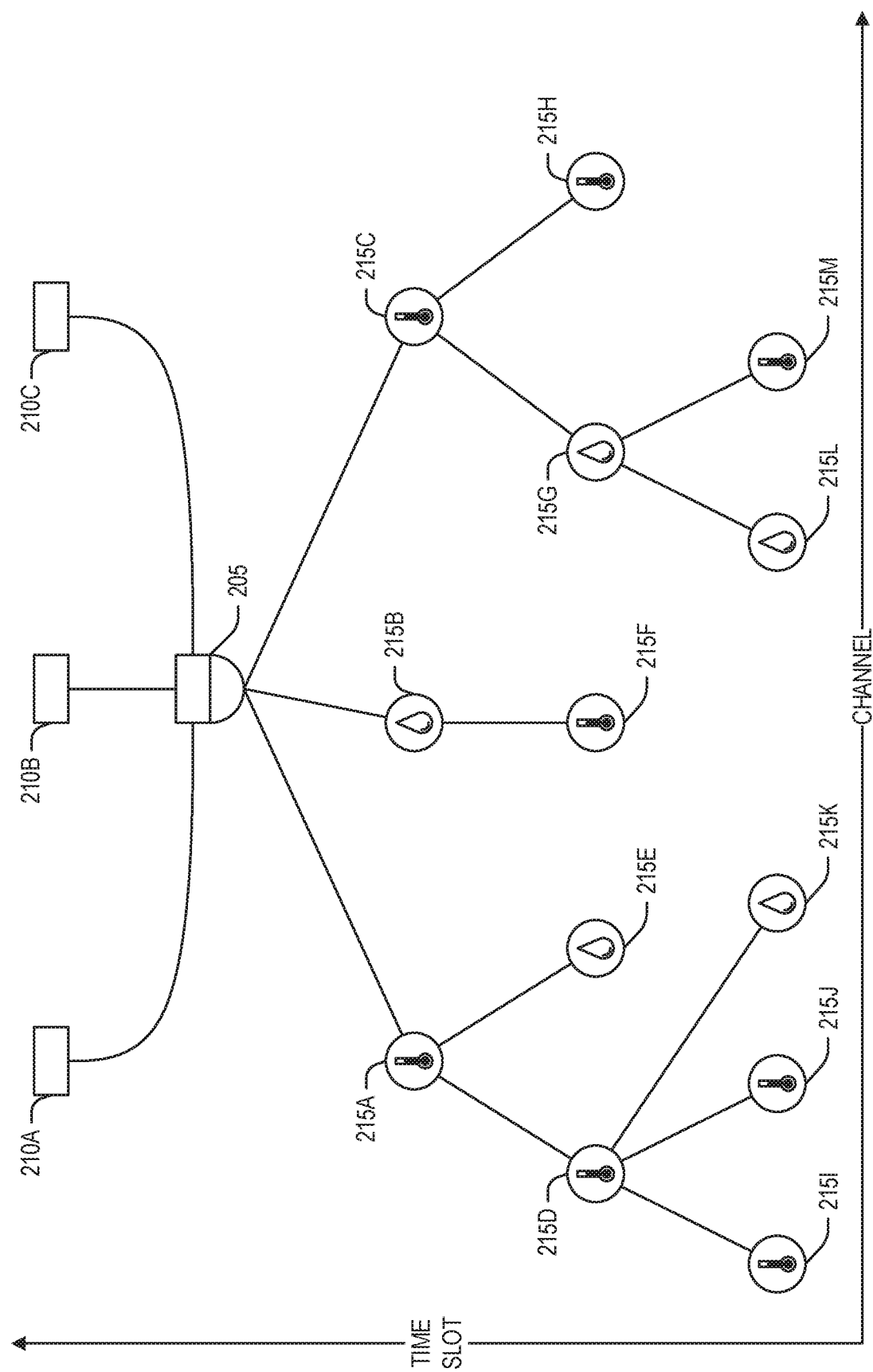
FIG. 2 illustrates an example network topology, according to an embodiment.

FIG. 2 illustrates an example network topology, according to an embodiment. OCF nodes 210 (e.g., OCF clients 210A, 210B, and 210C) are connected to the gateway 205, which bridges to, and acts as coordinator for, the IEEE 802.15.4e network with motes 215. For illustrative purposes, the motes 215 include hygrometers (e.g., motes 215B, 215E, 215G, 215K, and 215L) and thermometers (e.g., motes 215A, 215C, 215D, 215H, 215I, 215J, and 215M), although other sensors or devices may also be used.

Common configurations of an IEEE 802.15.4e runtime are based on periodic reporting of sensor data from the motes 215. The motes 215 may be employed with different sensor capabilities and it is the scheduling definition and execution of a TSCH based schedule that allows dense sensor deployments on IEEE 802.15.4e. The examples below describe a common data reporting usage model.

The IEEE 802.15.4e network forms a tree/mesh topology of motes 215 using RPL and a certain objective function (OF). The motes 215 are scheduled to communicate reports up towards the root of the tree (e.g., coordinator). The single gateway 205 operates as the coordinator and OCF intermediary, in this example, with a set of OCF client nodes 210 connected over some internet protocol (IP) based link at the northbound interface. A common use case is for OCF actors to get/request data of interest from the IEEE 802.15.4e mesh. The observe pattern defined in the OCF family of standards—and other IoT standards/frameworks—may be used to effectuate the requests because:

a) a subscription based request eliminates the need for data polling;
b) the intermediary 205 or motes 215 make efficient decisions on what constitutes a representational state change because they have access to the data, and
c) request-response patterns are inefficient in an 802.15.4e mesh topology.

While the reasons above provide a good foundation for using the observe pattern, they do not solve issues of scheduling, data or transmission aggregation, sensor data filtering, mote selection (e.g., of a mote 215) for further spectrum optimizations, or battery resource consumption.

Various algorithms may be constructed to allocate time and channel slots for the targeted set of motes 215 while still maintaining resources for management traffic such as Enhanced Beacon (EB) frames, RPL traffic, or shared or dedicated data slots for other motes 215 in the network. For example, a slot frame (SF) may be allocated for an observed traffic plane and timeslots in the SF may be allocated to motes 215 in each tree branch from the bottom of the branch upwards. In an example, each branch of the tree is assigned its own channel allowing parallel flow of data from the motes 215 of different branches. In an example, parents may aggregate data from children until frame capacity is reached. The parent may then be assigned the next available timeslot within the same channel if an additional time slot is needed (e.g., aggregated sensor data is larger than the capacity of one slot). Additional branches in the tree build up the schedule via assignments to the next available channel. If there is a conflict while allocating a timeslot—such as when the receiving mote 215 has already been allocated to perform an operation in another channel for a given timeslot—then the next timeslot is considered.

Figure 3:
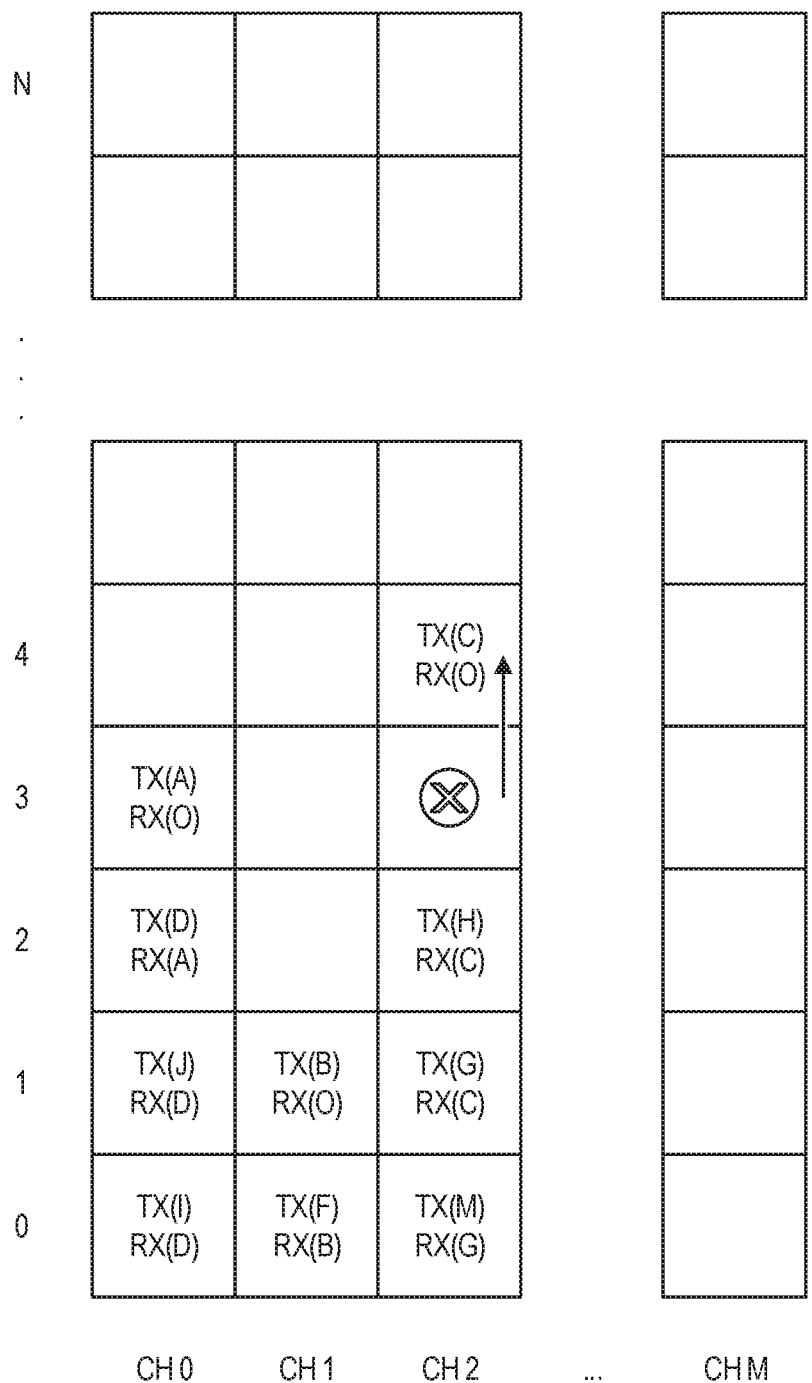
FIG. 3 illustrates an example of a radio channel and timeslot allocation, according to an embodiment.

For example, OCF client 210C requests all temperature data to be observed by transmitting a subscription request to the OCF intermediary 205. The OCF intermediary 205 builds a new schedule based on the request. The OCF intermediary 205 then communicates the new schedule to the motes 215 using, for example, EB fields, vendor fields, or allotted data frames to the motes 215 in the network. The schedule is built from the bottom up, starting in the bottom left corner, working vertically (e.g., upwards) in each branch to assign time slots and horizontally to assign channels. In this example, the resulting schedule is illustrated in FIG. 3 in which three channel allocations are used.

The following pseudo-code illustrates another example implementation of building the schedule:

```
input:
    Tree T containing n (n1,...,nn) nodes.
    Slot Frame F with t slots (t >> n).
    Channels m (m <= 16)
    Slot capacity c
    Sensor type t, and data size s
output:
    Schedule S
```

```
root <- GET_ROOT(T)
node <- GET_LEASTID_LEAF(T, root)
slot <- 0
ch_offset <- 0
parent <- GET_PARENT(node)
    do
        if (node.type == t || HAS_CHILDREN_TYPE(node, t))
            link <- ALLOCATE_LINK( )
            link.tx <- node
            link.rx <- parent
            link.ch_offset <- ch_offset
            children <- GET_NUM_CHILDREN_TYPE(node, t)
            if children == 0
                req_slot <- 1
            else
                req_slots = CEILING(children * s / c)
            link.req_slots = req_slots
            If IS_SLOT_SCHEDULED_FOR_SAME_RX_NODE(F, slot, link.rx)
                slot <- slot + GET_NEXT_CONTINOUS_SLOTS(req_slots)
            F(slot) <- INTALL_LINK(link)
            slot <- slot + req_slots
        if IS_ROOT(parent)
            slot <- 0
            ch_offset <- ch_offset + 1
        node <- GET_SIBLING(T, node)
        if (node == null)
            node <- parent
            parent <- GET_PARENT(node)
        else if(leaf <- GET_LEASTID_LEAF(T, node))
            node<-leaf
            parent <- GET_PARENT(leaf)
    while (node == root)
```

As noted above, an observe pattern enables data subscription and may be expanded to contain more complex queries. Example queries may include:
  GET/base-uri/sensor
  GET/base-uri/server/?query=select+room_id=1
  GET/base-uri/sensor/?above=30+below=5

Filter queries may be used to help optimize (e.g., better target) the set of motes 215 of interest and ensure that they get reserved/dedicated slots allocated in the schedule. Also, because motes 215 closer to the coordinator/gateway 205 consume more battery than the leaf or other router nodes—this happens because router motes closer to coordinator 215 are routing traffic to the coordinator 205 from all the motes 215 below themselves—an imbalance in resource consumption among the motes 215 may occur. To counter this, the coordinator 205 may optimize or balance resource efficiency by increasing SF size to impose a sparse scheduling scheme or by changing the RPL objective function, used to construct the network topology, based on certain platform resource (e.g., battery) values. Balancing the resource consumption of the motes improves the reliability of the network, including avoiding dead node problems.

FIG. 3 illustrates an example of a radio channel and timeslot allocation, according to an embodiment. The table illustrates the result of performing the example described above with respect to FIG. 2. The columns represent radio channels, the rows represent time slots (with a lower time slot indicating an earlier timeslot), and the cells representing a channel-time slot pair allocation. TX refers to a mote that may transmit and RX refers to a target mote for the transmission. The allocations proceed as follows:
  Channel 0:
    First, motes 215I and 215J are scheduled to transmit up to mote 215 in time slots 0 and 1 respectively.
    Second, mote 215D is scheduled to transmit to mote 215A in time slot 2.
    Third, mote 215A is scheduled to transmit to node 0 (the coordinator 205) in time slot 3.
  Channel 1:
    First, mote 215F is scheduled to transmit to mote 215B in time slot 0.
    Second, mote 215B is scheduled to transmit to node 0 (the coordinator 205) in time slot 1.
  Channel 3:
    First, mote 215M is scheduled to transmit to mote 215G in time slot 0.
    Second, mote 215G is scheduled to transmit to mote 215C in time slot 1.
    Third, mote 215H is scheduled to transmit to mote 215C in time slot 2.
    Fourth mote 215C is scheduled to transmit to node 0 (the coordinator 205) in time slot 4. The reason mote 215C was not scheduled in timeslot 3 is due to the coordinator 205 already being scheduled to receive from mote 215A in time slot three. Thus, the next available slot is used.

Figure 4:
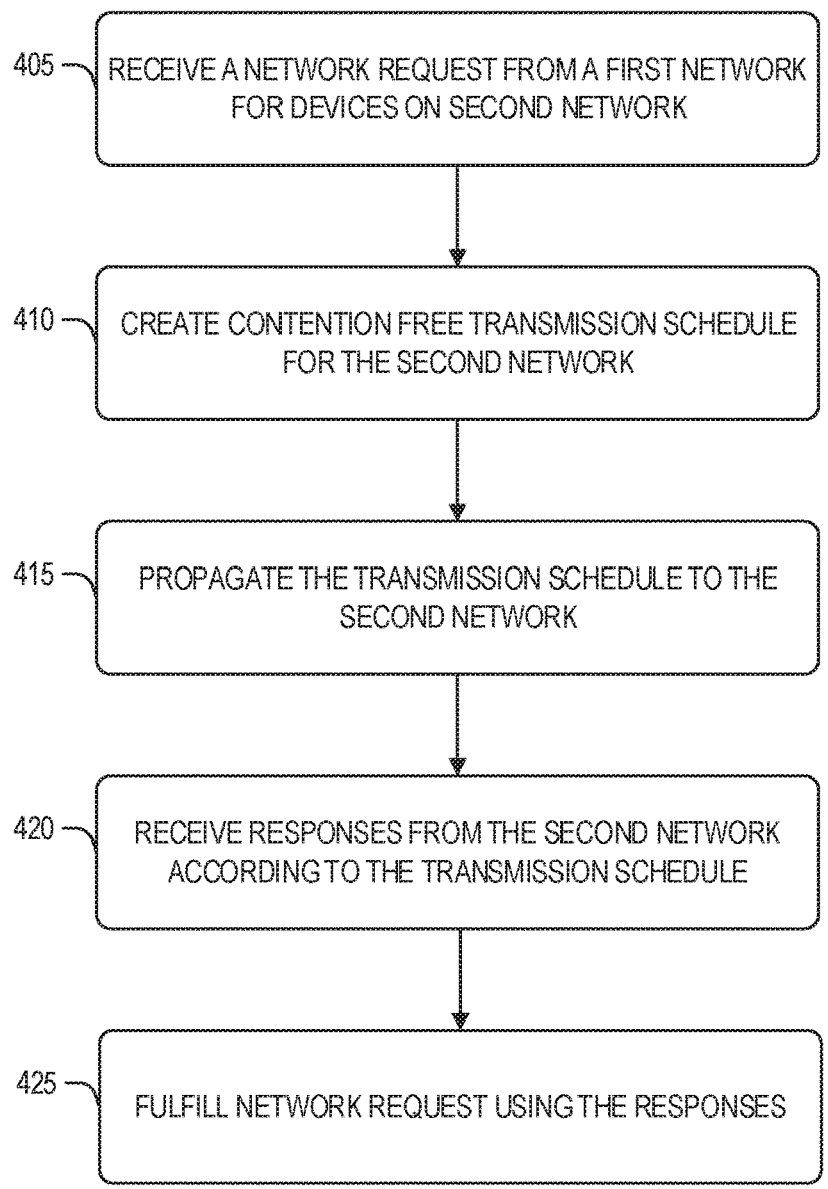
FIG. 4 illustrates an example of a method for radio resource scheduling, according to an embodiment.

FIG. 4 illustrates an example a method 400 for radio resource scheduling, according to an embodiment. The operations of the method 400 are implemented in electronic hardware, such as that described above and below (e.g., circuitry).

At operation 405, a network request may be received at a first network interface of a gateway device. In an example, the network request includes an information request to multiple devices connected to the gateway device via a second network interface. In an example, the first network interface connects to a first network that operates in accordance with an OCF family of standards. In an example, the network request is an OCF observe request. In an example, the observe request specifies at least one of a type or location. In an example, the multiple devices correspond to one or both type or the location.

At operation 410, a transmission schedule for the multiple devices that is contention free is created. In an example, the second network interface connects to a second network that operations in accordance with an IEEE 802.15.4e family of standards that employs TSCH. In an example, creating the transmission schedule includes assigning the multiple devices a respective channel and time slot. In an example, the operations of the method 400 may also include defining a new topology to flatten a connectivity tree of the second network and transmitting the topology to nodes in the second network. In an example, transmitting the topology includes transmitting an objective function to the nodes. Here, the objective function converts network metrics of reachable nodes to rankings for the reachable nodes. A node executing the objective function may then use the rankings (e.g., by selecting a highest rank reachable node) from the objective function output to select a parent node. In an example, the objective function prioritizes power source and ranks power constrained devices lower.

In an example, a channel and time slot for a given device in the multiple devices is assigned based on the given device position in the second network. In an example, network branches on a same level of the second network are assigned different channels. In an example, the same level is a level that directly connects to the gateway device.

In an example, network levels on a same branch of the second network are assigned different time slots. In an example, a level a first distance from the gateway device is assigned an earlier time slot than a level at a second distance. Here, the first distance is greater than the second distance and distance is measured by intervening devices in the second network. In an example, a second level device aggregates transmissions from first level devices. In an example, to aggregate the transmissions, the second level device aggregates data in the transmissions by combining the data into a new dataset. In an example, to aggregate the transmissions, the second level device combines the transmissions into a collection and transmits the collection to the gateway device.

At operation 415, the transmission schedule is propagated to the multiple devices.

At operation 420, responsive to the information request, information from the multiple devices is received according to the transmission schedule.

At operation 425, the network request is fulfilled with the information.

Existing OCF use cases have not addressed sense sensor deployments on scheduled networks such as IEEE 802.15.4e. Effective and efficient scheduling, as described herein, is an important technology as sensors, and other IoT devices, grow, increase deployment complexity. Further, using an OCF intermediary may provide several benefits including: consolidating memory resources to the intermediary from the motes; reducing inter mote network overhead by removing OCF required communications; increasing redundancy in sensor reporting as multiple sensors may be used to fulfill a single request; and centralized scheduling that may also implement data or transmission aggregation to further increase network efficiency.

Figure 5:
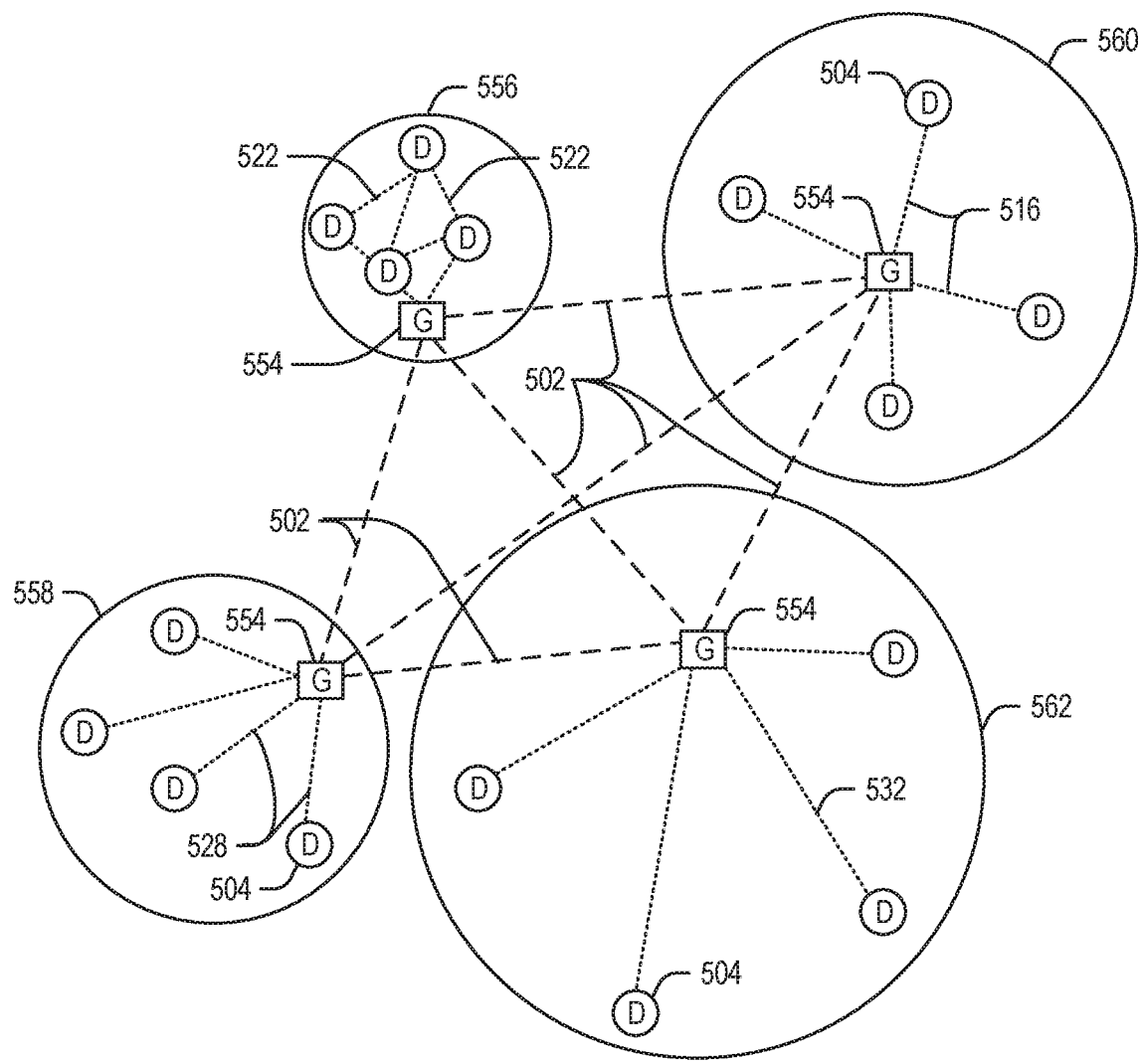
FIG. 5 illustrates a domain topology for respective internet-of-things (IoT) networks coupled through links to respective gateways, according to an embodiment.

FIG. 5 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks present a number of new challenges in a heterogeneous network of connectivity comprising a combination of wired and wireless technologies.

FIG. 5 specifically provides a simplified drawing of a domain topology that may be used for a number of internet-of-things (IoT) networks comprising IoT devices 504, with the IoT networks 556, 558, 560, 562, coupled through backbone links 502 to respective gateways 554. For example, a number of IoT devices 504 may communicate with a gateway 554, and with each other through the gateway 554. To simplify the drawing, not every IoT device 504, or communications link (e.g., link 516, 522, 528, or 532) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 556 using Bluetooth low energy (BLE) links 522. Other types of IoT networks that may be present include a wireless local area network (WLAN) network 558 used to communicate with IoT devices 504 through IEEE 802.11 (Wi-Fi®) links 528, a cellular network 560 used to communicate with IoT devices 504 through an LTE/LTE-A (4G) or 5G cellular network, and a low-power wide area (LPWA) network 562, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 504, such as over the backbone links 502, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 556, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 558, for instance, may use systems that perform standards conversion to provide multi-standard connectivity, enabling IoT devices 504 using different protocols to communicate. Further systems may provide seamless interconnectivity across a multi-standard infrastructure comprising visible Internet resources and hidden Internet resources.

Communications in the cellular network 560, for instance, may be enhanced by systems that offload data, extend communications to more remote devices, or both. The LPWA network 562 may include systems that perform non-Internet protocol (IP) to IP interconnections, addressing, and routing. Further, each of the IoT devices 504 may include the appropriate transceiver for wide area communications with that device. Further, each IoT device 504 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device.

Figure 6:
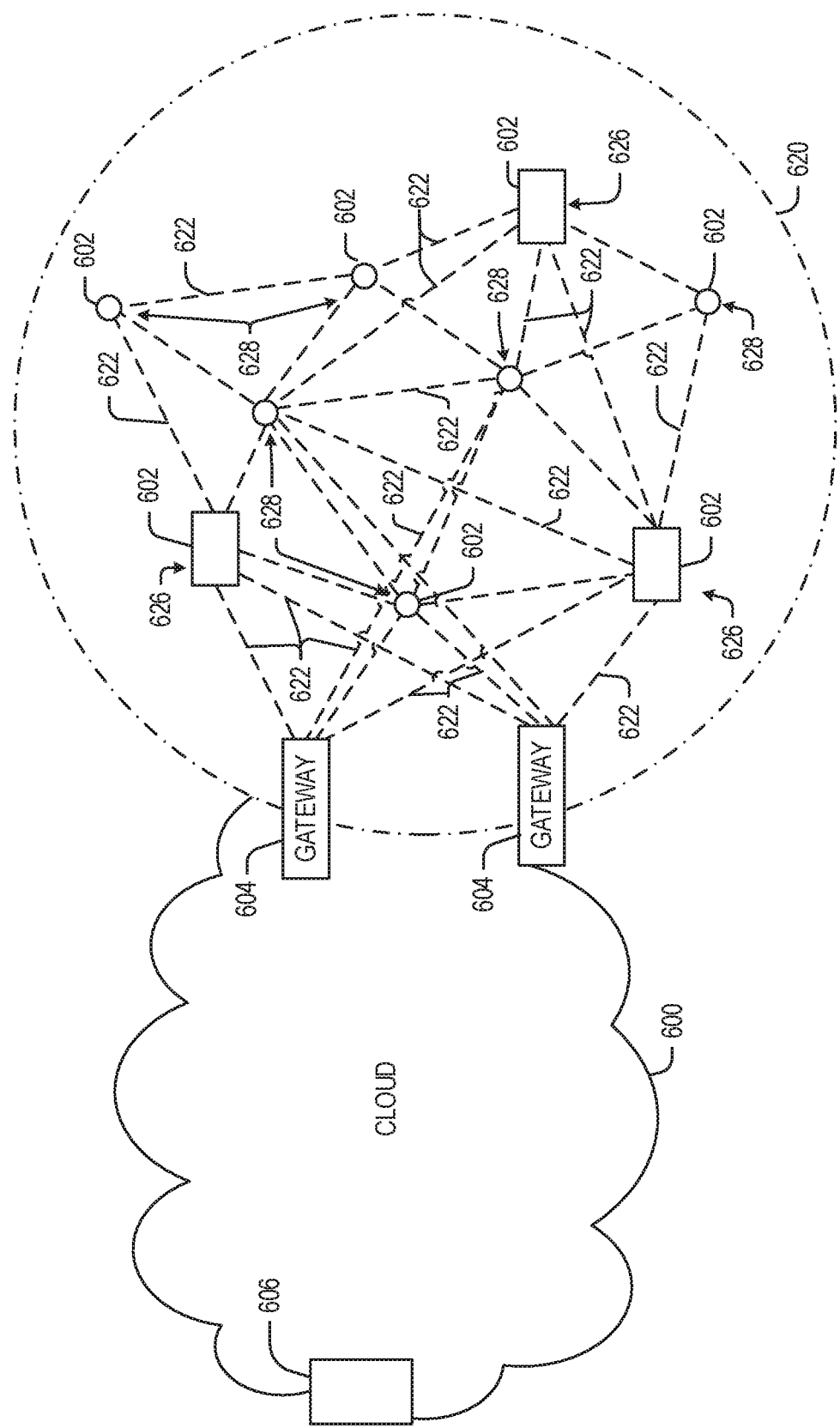
FIG. 6 illustrates a cloud computing network in communication with a mesh network of IoT devices operating as a fog device at the edge of the cloud computing network, according to an embodiment.

FIG. 6 illustrates a cloud computing network in communication with a mesh network of IoT devices (devices 602) operating as a fog device at the edge of the cloud computing network. The mesh network of IoT devices may be termed a fog 620, operating at the edge of the cloud 600. To simplify the diagram, not every IoT device 602 is labeled.

The fog 620 may be considered to be a massively interconnected network wherein a number of IoT devices 602 are in communications with each other, for example, by radio links 622. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 602 are shown in this example, gateways 604, data aggregators 626, and sensors 628, although any combinations of IoT devices 602 and functionality may be used. The gateways 604 may be edge devices that provide communications between the cloud 600 and the fog 620, and may also provide the backend process function for data obtained from sensors 628, such as motion data, flow data, temperature data, and the like. The data aggregators 626 may collect data from any number of the sensors 628, and perform the back end processing function for the analysis. The results, raw data, or both may be passed along to the cloud 600 through the gateways 604. The sensors 628 may be full IoT devices 602, for example, capable of both collecting data and processing the data. In some cases, the sensors 628 may be more limited in functionality, for example, collecting the data and allowing the data aggregators 626 or gateways 604 to process the data.

Communications from any IoT device 602 may be passed along the most convenient path between any of the IoT devices 602 to reach the gateways 604. In these networks, the number of interconnections provide substantial redundancy, allowing communications to be maintained, even with the loss of a number of IoT devices 602. Further, the use of a mesh network may allow IoT devices 602 that are very low power or located at a distance from infrastructure to be used, as the range to connect to another IoT device 602 may be much less than the range to connect to the gateways 604.

The fog 620 provided from these IoT devices 602 may be presented to devices in the cloud 600, such as a server 606, as a single device located at the edge of the cloud 600, e.g., a fog device. In this example, the alerts coming from the fog device may be sent without being identified as coming from a specific IoT device 602 within the fog 620. In this fashion, the fog 620 may be considered a distributed platform that provides computing and storage resources to perform processing or data-intensive tasks such as data analytics, data aggregation, and machine-learning, among others.

In some examples, the IoT devices 602 may be configured using an imperative programming style. e.g., with each IoT device 602 having a specific function and communication partners. However, the IoT devices 602 forming the fog device may be configured in a declarative programming style, allowing the IoT devices 6602 to reconfigure their operations and communications, such as to determine needed resources in response to conditions, queries, and device failures. As an example, a query from a user located at a server 606 about the operations of a subset of equipment monitored by the IoT devices 602 may result in the fog 620 device selecting the IoT devices 602, such as particular sensors 628, needed to answer the query. The data from these sensors 628 may then be aggregated and analyzed by any combination of the sensors 628, data aggregators 626, or gateways 604, before being sent on by the fog 620 device to the server 606 to answer the query. In this example. IoT devices 602 in the fog 620 may select the sensors 628 used based on the query, such as adding data from flow sensors or temperature sensors. Further, if some of the IoT devices 602 are not operational, other IoT devices 602 in the fog 620 device may provide analogous data, if available.

Figure 7:
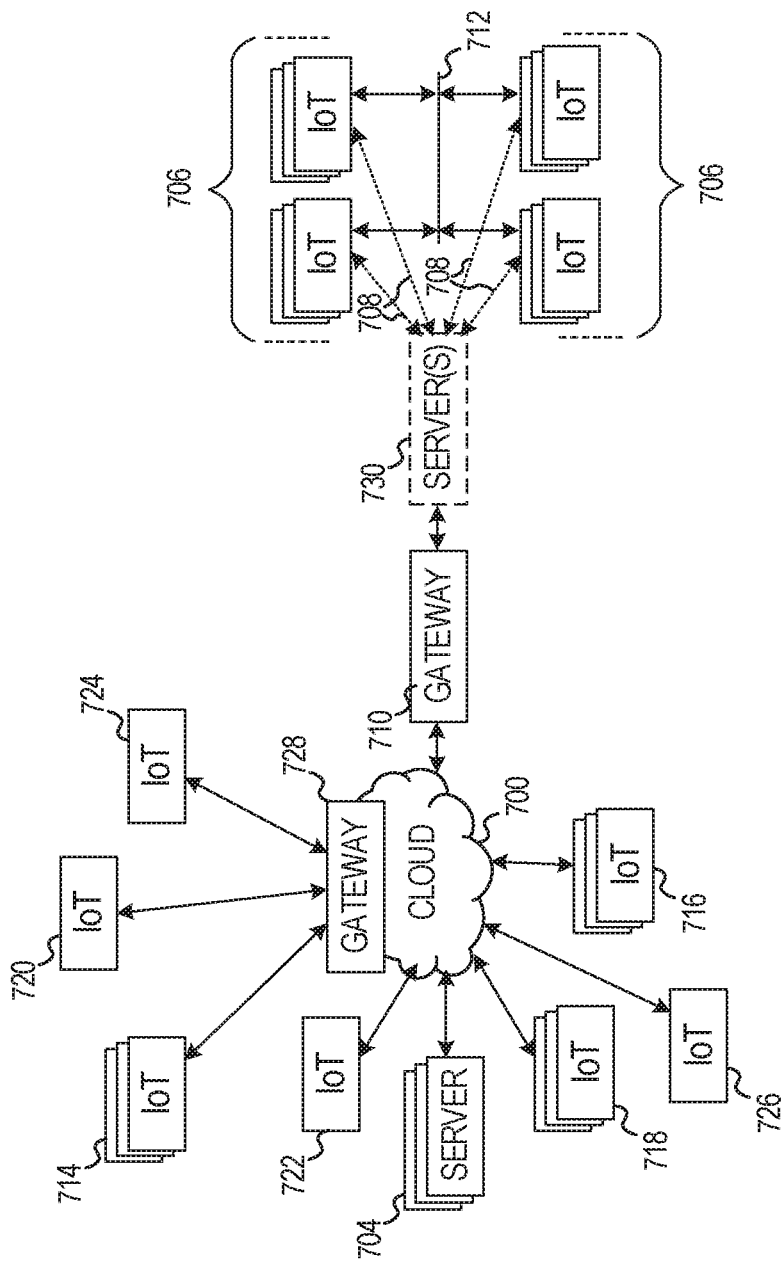
FIG. 7 illustrates a block diagram communications among a number of IoT devices, according to an embodiment.

FIG. 7 illustrates a drawing of a cloud computing network, or cloud 700, in communication with a number of Internet of Things (IoT) devices. The cloud 700 may represent the Internet, or may be a local area network (LAN), or a wide area network (WAN), such as a proprietary network for a company. The IoT devices may include any number of different types of devices, grouped in various combinations. For example, a traffic control group 706 may include IoT devices along streets in a city. These IoT devices may include stoplights, traffic flow monitors, cameras, weather sensors, and the like. The traffic control group 706, or other subgroups, may be in communication with the cloud 700 through wired or wireless links 708, such as LPWA links, optical links, and the like. Further, a wired or wireless sub-network 712 may allow the IoT devices to communicate with each other, such as through a local area network, a wireless local area network, and the like. The IoT devices may use another device, such as a gateway 710 or 728 to communicate with remote locations such as the cloud 700; the IoT devices may also use one or more servers 730 to facilitate communication with the cloud 700 or with the gateway 710. For example, the one or more servers 730 may operate as an intermediate network node to support a local edge cloud or fog implementation among a local area network. Further, the gateway 728 that is depicted may operate in a cloud-to-gateway-to-many edge devices configuration, such as in an assignment of the various IoT devices 714, 720, 724 being constrained or dynamic to an assignment and use of resources in the cloud 700.

Other example groups of IoT devices may include remote weather stations 714, local information terminals 716, alarm systems 718, automated teller machines 720, alarm panels 722, or moving vehicles, such as emergency vehicles 724 or other vehicles 726, among many others. Each of these IoT devices may be in communication with other IoT devices, with servers 704, with another IoT fog device or system, or a combination therein. The groups of IoT devices may be deployed in various residential, commercial, industrial, settings (including both private or public settings).

As may be seen from FIG. 7, a large number of IoT devices may be communicating through the cloud 700. This may allow different IoT devices to request or provide information to other devices autonomously. For example, a group of IoT devices (e.g., the traffic control group 706) may request a current weather forecast from a group of remote weather stations 714, which may provide the forecast without human intervention. Further, an emergency vehicle 724 may be alerted by an automated teller machine 720 that a burglary is in progress. As the emergency vehicle 724 proceeds towards the automated teller machine 720, it may access the traffic control group 706 to request clearance to the location, for example, by lights turning red to block cross traffic at an intersection in sufficient time for the emergency vehicle 724 to have unimpeded access to the intersection.

Clusters of IoT devices, such as the remote weather stations 714 or the traffic control group 706, may be equipped to communicate with other IoT devices as well as with the cloud 700. This may allow the IoT devices to form an ad-hoc network between the devices, allowing them to function as a single device, which may be termed a fog device or system.

Figure 8:
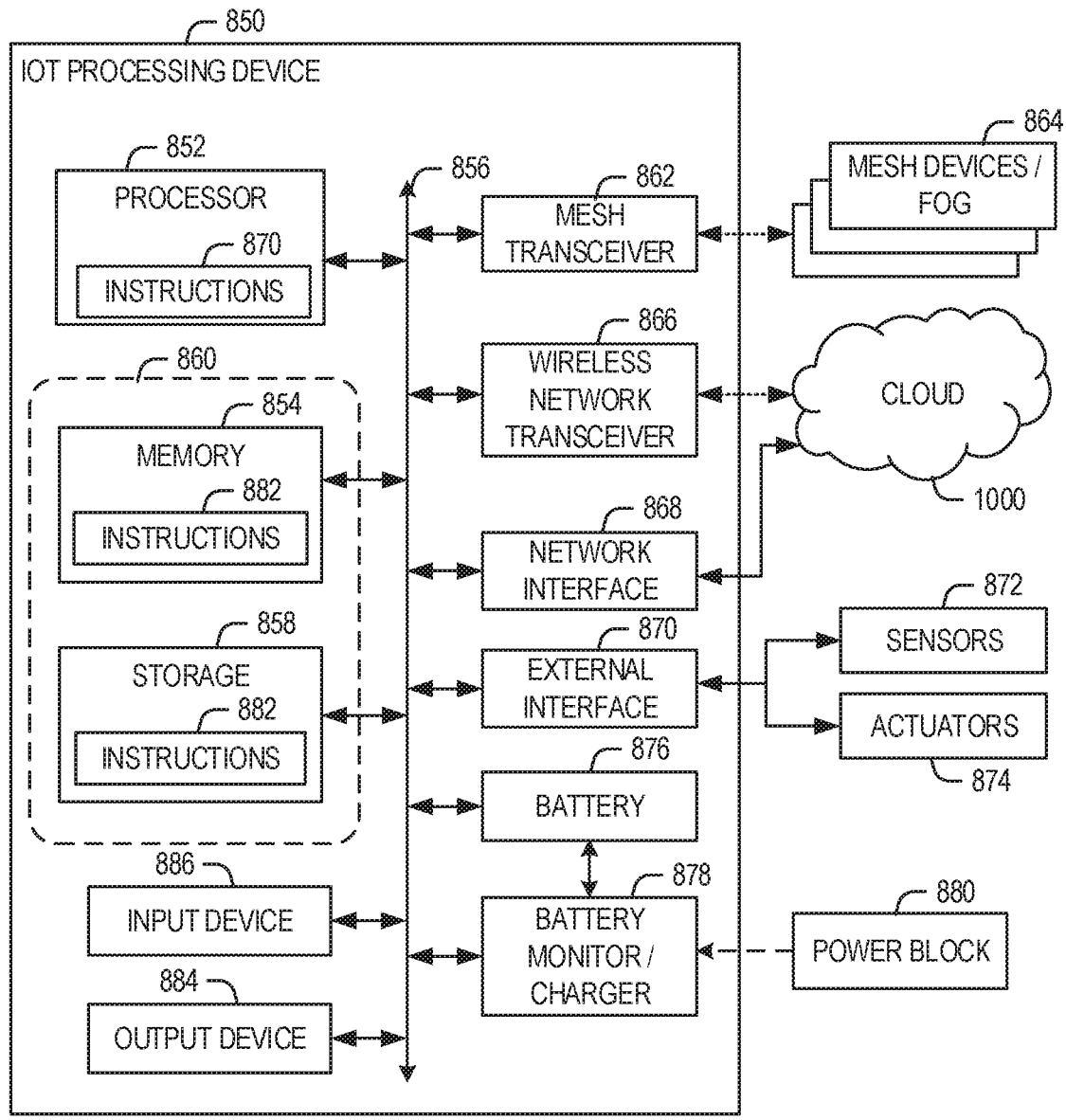
FIG. 8 illustrates a block diagram for an example IoT processing system architecture upon which any one or more of the techniques (e.g., operations, processes, methods, and methodologies) discussed herein may be performed, according to an embodiment.

FIG. 8 is a block diagram of an example of components that may be present in an IoT device 850 for implementing the techniques described herein. The IoT device 850 may include any combinations of the components shown in the example or referenced in the disclosure above. The components may be implemented as ICs, portions thereof, discrete electronic devices, or other modules, logic, hardware, software, firmware, or a combination thereof adapted in the IoT device 850, or as components otherwise incorporated within a chassis of a larger system. Additionally, the block diagram of FIG. 8 is intended to depict a high-level view of components of the IoT device 850. However, some of the components shown may be omitted, additional components may be present, and different arrangement of the components shown may occur in other implementations.

The IoT device 850 may include a processor 852, which may be a microprocessor, a multi-core processor, a multi-threaded processor, an ultra-low voltage processor, an embedded processor, or other known processing element. The processor 852 may be a part of a system on a chip (SoC) in which the processor 852 and other components are formed into a single integrated circuit, or a single package, such as the Edison™ or Galileo™ SoC boards from Intel. As an example, the processor 852 may include an Intel® Architecture Core™ based processor, such as a Quark™, an Atom™, an i3, an i5, an i7, or an MCU-class processor, or another such processor available from Intel® Corporation. Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 852 may communicate with a system memory 854 over an interconnect 856 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example the storage 858 may be implemented via a solid state disk drive (SSDD). Other devices that may be used for the storage 858 include flash memory cards, such as SD cards, microSD cards, xD picture cards, and the like, and USB flash drives. In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in a SoC based system. Other bus systems may be included, such as an I2C interface, an SPI interface, point to point interfaces, and a power bus, among others.

The interconnect 856 may couple the processor 852 to a mesh transceiver 862, for communications with other mesh devices 864. The mesh transceiver 862 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group. or the ZigBee® standard, among others. Any number of radios, configured for a particular wireless communication protocol may be used for the connections to the mesh devices 864. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 862 may communicate using multiple standards or radios for communications at different range. For example, the IoT device 850 may communicate with close devices, e.g., within about 8 meters, using a local transceiver based on BLE, or another low power radio, to save power. More distant mesh devices 864. e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 866 may be included to communicate with devices or services in the cloud 800 via local or wide area network protocols. The wireless network transceiver 866 may be a LPWA transceiver that follows the IEEE 802.15.4, or IEEE 802.15.4g standards, among others. The IoT device 850 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 862 and wireless network transceiver 866, as described herein. For example, the radio transceivers 862 and 866 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 862 and 866 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 866, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 868 may be included to provide a wired communication to the cloud 800 or to other devices, such as the mesh devices 864. The wired communication may provide an Ethernet connection, or may be based on other types of networks, such as Controller Area Network (CAN), Local Interconnect Network (LIN), DeviceNet, ControlNet, Data Highway+. PROFIBUS, or PROFINET, among many others. An additional NIC 868 may be included to allow connect to a second network, for example, a NIC 868 providing communications to the cloud over Ethernet, and a second NIC 868 providing communications to other devices over another type of network.

The interconnect 856 may couple the processor 852 to an external interface 870 that is used to connect external devices or subsystems. The external devices may include sensors 872, such as accelerometers, level sensors, flow sensors, optical light sensors, camera sensors, temperature sensors, a global positioning system (GPS) sensors, pressure sensors, barometric pressure sensors, and the like. The external interface 870 further may be used to connect the IoT device 850 to actuators 874, such as power switches, valve actuators, an audible sound generator, a visual warning device, and the like.

In some optional examples, various input/output (I/O) devices may be present within, or connected to, the IoT device 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 850.

A battery 876 may power the IoT device 850, although in examples in which the IoT device 850 is mounted in a fixed location, it may have a power supply coupled to an electrical grid. The battery 876 may be a lithium ion battery, or a metal-air battery, such as a zinc-air battery, an aluminum-air battery, a lithium-air battery, and the like.

A battery monitor/charger 878 may be included in the IoT device 850 to track the state of charge (SoCh) of the battery 876. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 878 may communicate the information on the battery 876 to the processor 852 over the interconnect 856. The battery monitor/charger 878 may also include an analog-to-digital (ADC) convertor that allows the processor 852 to directly monitor the voltage of the battery 876 or the current flow from the battery 876. The battery parameters may be used to determine actions that the IoT device 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the IoT device 850. A wireless battery charging circuit, such as an LTC4020 chip from Linear Technologies of Milpitas, Calif., among others, may be included in the battery monitor/charger 878. The specific charging circuits chosen depend on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine readable medium 860 including code to direct the processor 852 to perform electronic operations in the IoT device 850. The processor 852 may access the non-transitory, machine readable medium 860 over the interconnect 856. For instance, the non-transitory, machine readable medium 860 may be embodied by devices described for the storage 858 of FIG. 8 or may include specific storage units such as optical disks, flash drives, or any number of other hardware devices. The non-transitory, machine readable medium 860 may include instructions to direct the processor 852 to perform a specific sequence or flow of actions.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Figure 9:
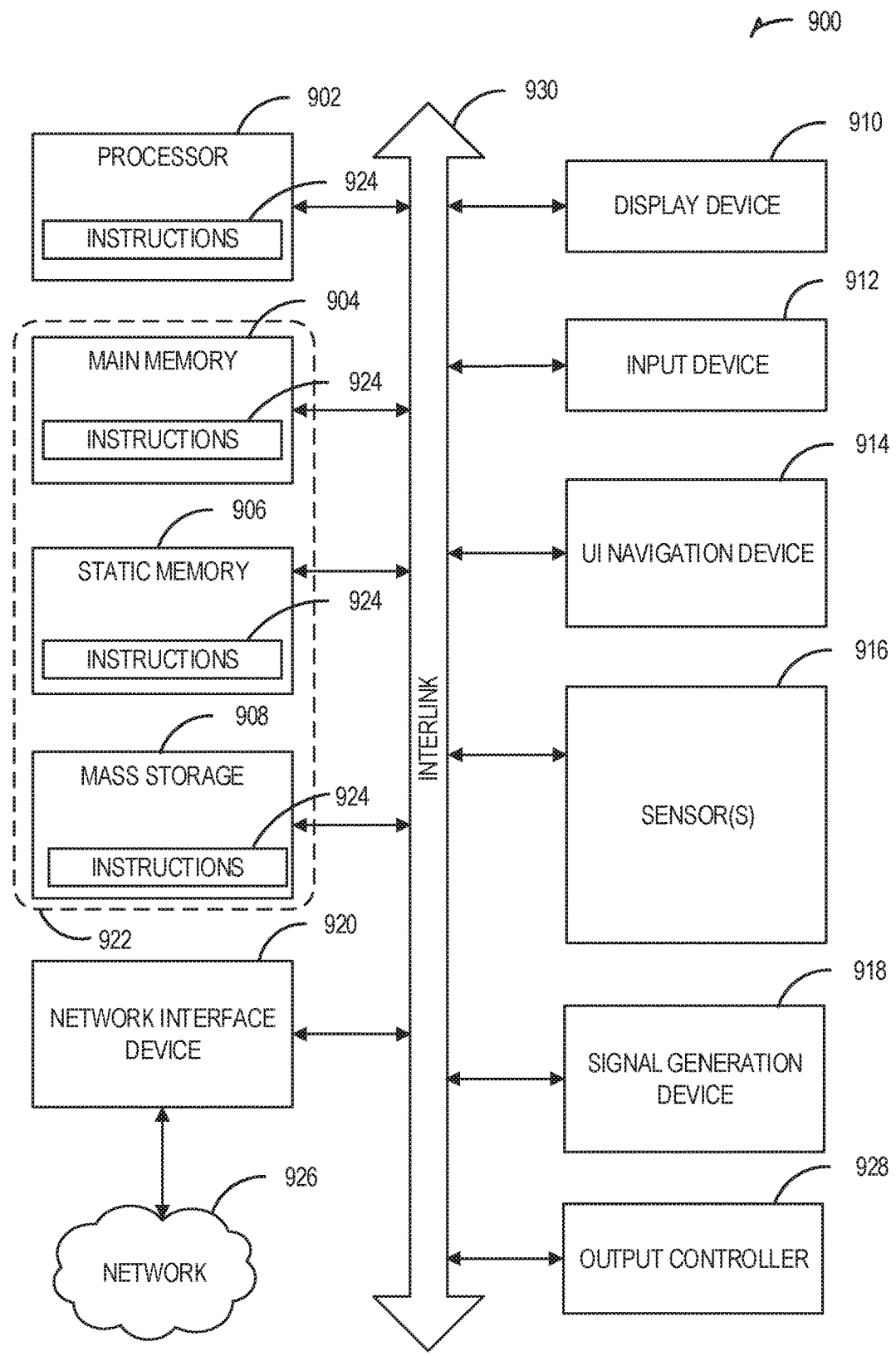
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. Examples, as described herein, may include, or may operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute the machine readable media 922. While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

Additional Notes & Examples

Example 1 is a system for radio resource scheduling, the system comprising processing circuitry to: receive a network request at a first network interface of a gateway device, the network request including an information request to multiple devices connected to the gateway device via a second network interface; create a transmission schedule for the multiple devices that is contention free; propagate the transmission schedule to the multiple devices; receive information, responsive to the information request, from the multiple devices according to the transmission schedule; and fulfill the network request with the information.

In Example 2, the subject matter of Example 1 optionally includes wherein network request is a subscription in accordance with a publication/subscription communications model.

In Example 3, the subject matter of any one or more of Examples 1-2 optionally include wherein the first network interface connects to a first network that operates in accordance with an Open Connectivity Foundation (OCF) family of standards.

In Example 4, the subject matter of Example 3 optionally includes wherein the network request is an OCF observe request.

In Example 5, the subject matter of Example 4 optionally includes wherein the observe request specifies at least one of a type or location, and wherein the multiple devices correspond to the type or the location.

In Example 6, the subject matter of any one or more of Examples 1-5 optionally include wherein the second network interface connects to a second network that operations in accordance with an IEEE 802.15.4c family of standards that employs time slot channel hopping (TSCH).

In Example 7, the subject matter of Example 6 optionally includes wherein, to create the transmission schedule, the processing circuitry assigns the multiple devices a respective channel and time slot.

In Example 8, the subject matter of Example 7 optionally includes wherein a channel and time slot for a given device in the multiple devices is assigned based on the given device position in the second network.

In Example 9, the subject matter of Example 8 optionally includes wherein network branches on a same level of the second network are assigned different channels.

In Example 10, the subject matter of Example 9 optionally includes wherein the same level is a level that directly connects to the gateway device.

In Example 11, the subject matter of any one or more of Examples 8-10 optionally include wherein network levels on a same branch of the second network are assigned different time slots.

In Example 12, the subject matter of Example 11 optionally includes wherein a level a first distance from the gateway device is assigned an earlier time slot than a level at a second distance, the first distance being greater than the second distance, distance being measured by counting devices to the gateway in the second network.

In Example 13, the subject matter of Example 12 optionally includes wherein a second level device aggregates transmissions from first level devices.

In Example 14, the subject matter of Example 13 optionally includes wherein, to aggregate the transmissions, the second level device aggregates data in the transmissions by combining the data into a new dataset.

In Example 15, the subject matter of any one or more of Examples 13-14 optionally include wherein, to aggregate the transmissions, the second level device combines the transmissions into a collection and transmits the collection to the gateway device.

In Example 16, the subject matter of any one or more of Examples 7-15 optionally include wherein the processing circuitry is to: define a new topology to flatten a connectivity tree of the second network; and transmit the topology to nodes in the second network.

In Example 17, the subject matter of Example 16 optionally includes wherein, to transmit the topology, the processing circuitry transmits an objective function to the nodes, the objective function taking network metrics of reachable nodes as an input and ranking the reachable nodes, a node executing the objective function selecting a highest rank reachable node from the objective function output as a parent node.

In Example 18, the subject matter of Example 17 optionally includes wherein the objective function prioritizes power source and ranks power constrained devices lower than other devices.

Example 19 is a method for radio resource scheduling, the method comprising: receiving a network request at a first network interface of a gateway device, the network request including an information request to multiple devices connected to the gateway device via a second network interface;

creating a transmission schedule for the multiple devices that is contention free; propagating the transmission schedule to the multiple devices; receiving information, responsive to the information request, from the multiple devices according to the transmission schedule; and fulfilling the network request with the information.

In Example 20, the subject matter of Example 19 optionally includes wherein network request is a subscription in accordance with a publication/subscription communications model.

In Example 21, the subject matter of any one or more of Examples 19-20 optionally include wherein the first network interface connects to a first network that operates in accordance with an Open Connectivity Foundation (OCF) family of standards.

In Example 22, the subject matter of Example 21 optionally includes wherein the network request is an OCF observe request.

In Example 23, the subject matter of Example 22 optionally includes wherein the observe request specifies at least one of a type or location, and wherein the multiple devices correspond to the type or the location.

In Example 24, the subject matter of any one or more of Examples 19-23 optionally include wherein the second network interface connects to a second network that operations in accordance with an IEEE 802.15.4e family of standards that employs time slot channel hopping (TSCH).

In Example 25, the subject matter of Example 24 optionally includes wherein creating the transmission schedule includes assigning the multiple devices a respective channel and time slot.

1 In Example 26, the subject matter of Example 25 optionally includes wherein a channel and time slot for a given device in the multiple devices is assigned based on the given device position in the second network.

In Example 27, the subject matter of Example 26 optionally includes wherein network branches on a same level of the second network are assigned different channels.

In Example 28, the subject matter of Example 27 optionally includes wherein the same level is a level that directly connects to the gateway device.

In Example 29, the subject matter of any one or more of Examples 26-28 optionally include wherein network levels on a same branch of the second network are assigned different time slots.

In Example 30, the subject matter of Example 29 optionally includes wherein a level a first distance from the gateway device is assigned an earlier time slot than a level at a second distance, the first distance being greater than the second distance, distance being measured by counting devices to the gateway in the second network.

1 In Example 31, the subject matter of Example 30 optionally includes wherein a second level device aggregates transmissions from first level devices.

In Example 32, the subject matter of Example 31 optionally includes wherein, to aggregate the transmissions, the second level device aggregates data in the transmissions by combining the data into a new dataset.

In Example 33, the subject matter of any one or more of Examples 31-32 optionally include wherein, to aggregate the transmissions, the second level device combines the transmissions into a collection and transmits the collection to the gateway device.

In Example 34, the subject matter of any one or more of Examples 25-33 optionally include defining a new topology to flatten a connectivity tree of the second network; and transmitting the topology to nodes in the second network.

In Example 35, the subject matter of Example 34 optionally includes wherein transmitting the topology includes transmitting an objective function to the nodes, the objective function taking network metrics of reachable nodes as an input and ranking the reachable nodes, a node executing the objective function selecting a highest rank reachable node from the objective function output as a parent node.

In Example 36, the subject matter of Example 35 optionally includes wherein the objective function prioritizes power source and ranks power constrained devices lower than other devices.

Example 37 is a system comprising means to perform any method of Examples 19-36.

Example 38 is at least one machine readable medium including instructions that, when executed by processing circuitry, cause the processing circuitry to perform any method of Examples 19-36.

Example 39 is at least one machine readable medium including instructions for radio resource scheduling, the instructions, when executed by processing circuitry, cause the processing circuitry to perform operations comprising: receiving a network request at a first network interface of a gateway device, the network request including an information request to multiple devices connected to the gateway device via a second network interface; creating a transmission schedule for the multiple devices that is contention free; propagating the transmission schedule to the multiple devices; receiving information, responsive to the information request, from the multiple devices according to the transmission schedule; and fulfilling the network request with the information.

In Example 40, the subject matter of Example 39 optionally includes wherein network request is a subscription in accordance with a publication/subscription communications model.

In Example 41, the subject matter of any one or more of Examples 39-40 optionally include wherein the first network interface connects to a first network that operates in accordance with an Open Connectivity Foundation (OCF) family of standards.

In Example 42, the subject matter of Example 41 optionally includes wherein the network request is an OCF observe request.

In Example 43, the subject matter of Example 42 optionally includes wherein the observe request specifies at least one of a type or location, and wherein the multiple devices correspond to the type or the location.

In Example 44, the subject matter of any one or more of Examples 39-43 optionally include wherein the second network interface connects to a second network that operations in accordance with an IEEE 802.15.4e family of standards that employs time slot channel hopping (TSCH).

In Example 45, the subject matter of Example 44 optionally includes wherein creating the transmission schedule includes assigning the multiple devices a respective channel and time slot.

In Example 46, the subject matter of Example 45 optionally includes wherein a channel and time slot for a given device in the multiple devices is assigned based on the given device position in the second network.

In Example 47, the subject matter of Example 46 optionally includes wherein network branches on a same level of the second network are assigned different channels.

In Example 48, the subject matter of Example 47 optionally includes wherein the same level is a level that directly connects to the gateway device.

In Example 49, the subject matter of any one or more of Examples 46-48 optionally include wherein network levels on a same branch of the second network are assigned different time slots.

In Example 50, the subject matter of Example 49 optionally includes wherein a level a first distance from the gateway device is assigned an earlier time slot than a level at a second distance, the first distance being greater than the second distance, distance being measured by counting devices to the gateway in the second network.

In Example 51, the subject matter of Example 50 optionally includes wherein a second level device aggregates transmissions from first level devices.

In Example 52, the subject matter of Example 51 optionally includes wherein, to aggregate the transmissions, the second level device aggregates data in the transmissions by combining the data into a new dataset.

In Example 53, the subject matter of any one or more of Examples 51-52 optionally include wherein, to aggregate the transmissions, the second level device combines the transmissions into a collection and transmits the collection to the gateway device.

In Example 54, the subject matter of any one or more of Examples 45-53 optionally include wherein the operations comprise: defining a new topology to flatten a connectivity tree of the second network, and transmitting the topology to nodes in the second network.

In Example 55, the subject matter of Example 54 optionally includes wherein transmitting the topology includes transmitting an objective function to the nodes, the objective function taking network metrics of reachable nodes as an input and ranking the reachable nodes, a node executing the objective function selecting a highest rank reachable node from the objective function output as a parent node.

In Example 56, the subject matter of Example 55 optionally includes wherein the objective function prioritizes power source and ranks power constrained devices lower than other devices.

Example 57 is a system for radio resource scheduling, the system comprising: means for receiving a network request at a first network interface of a gateway device, the network request including an information request to multiple devices connected to the gateway device via a second network interface; means for creating a transmission schedule for the multiple devices that is contention free; means for propagating the transmission schedule to the multiple devices; means for receiving information, responsive to the information request, from the multiple devices according to the transmission schedule; and means for fulfilling the network request with the information.

In Example 58, the subject matter of Example 57 optionally includes wherein network request is a subscription in accordance with a publication/subscription communications model.

In Example 59, the subject matter of any one or more of Examples 57-58 optionally include wherein the first network interface connects to a first network that operates in accordance with an Open Connectivity Foundation (OCF) family of standards.

In Example 60, the subject matter of Example 59 optionally includes wherein the network request is an OCF observe request.

In Example 61, the subject matter of Example 60 optionally includes wherein the observe request specifies at least one of a type or location, and wherein the multiple devices correspond to the type or the location.

In Example 62, the subject matter of any one or more of Examples 57-61 optionally include wherein the second network interface connects to a second network that operations in accordance with an IEEE 802.15.4e family of standards that employs time slot channel hopping (TSCH).

In Example 63, the subject matter of Example 62 optionally includes wherein the means for creating the transmission schedule include means for assigning the multiple devices a respective channel and time slot.

In Example 64, the subject matter of Example 63 optionally includes wherein a channel and time slot for a given device in the multiple devices is assigned based on the given device position in the second network.

In Example 65, the subject matter of Example 64 optionally includes wherein network branches on a same level of the second network are assigned different channels.

In Example 66, the subject matter of Example 65 optionally includes wherein the same level is a level that directly connects to the gateway device.

In Example 67, the subject matter of any one or more of Examples 64-66 optionally include wherein network levels on a same branch of the second network are assigned different time slots.

In Example 68, the subject matter of Example 67 optionally includes wherein a level a first distance from the gateway device is assigned an earlier time slot than a level at a second distance, the first distance being greater than the second distance, distance being measured by counting devices to the gateway in the second network.

In Example 69, the subject matter of Example 68 optionally includes wherein a second level device aggregates transmissions from first level devices.

In Example 70, the subject matter of Example 69 optionally includes wherein, to aggregate the transmissions, the second level device aggregates data in the transmissions by combining the data into a new dataset.

In Example 71, the subject matter of any one or more of Examples 69-70 optionally include wherein, to aggregate the transmissions, the second level device combines the transmissions into a collection and transmits the collection to the gateway device.

In Example 72, the subject matter of any one or more of Examples 63-71 optionally include means for defining a new topology to flatten a connectivity tree of the second network; and means for transmitting the topology to nodes in the second network.

In Example 73, the subject matter of Example 72 optionally includes wherein the means for transmitting the topology include means for transmitting an objective function to the nodes, the objective function taking network metrics of reachable nodes as an input and ranking the reachable nodes, a node executing the objective function selecting a highest rank reachable node from the objective function output as a parent node.

In Example 74, the subject matter of Example 73 optionally includes wherein the objective function prioritizes power source and ranks power constrained devices lower than other devices.

Example 75 is at least one machine-readable medium including instructions, which when executed by a machine, cause the machine to perform operations of any of the operations of Examples 1-74.

Example 76 is an apparatus comprising means for performing any of the operations of Examples 1-74.

Example 77 is a system to perform the operations of any of the Examples 1-74.

Example 78 is a method to perform the operations of any of the Examples 1-74.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for radio resource scheduling, the system comprising processing circuitry to:
   receive a network request at a first network interface of a gateway device, the network request including an information request to multiple devices connected to the gateway device via a second network interface;
   create a transmission schedule for the multiple devices that is contention free;
   propagate the transmission schedule to the multiple devices;
   receive information, responsive to the information request, from the multiple devices according to the transmission schedule; and
   fulfill the network request with the information.

2. The system of claim 1, wherein the first network interface connects to a first network that operates in accordance with an Open Connectivity Foundation (OCF) family of standards.

3. The system of claim 1, wherein the second network interface connects to a second network that operations in accordance with an IEEE 802.15.4e family of standards that employs time slot channel hopping (TSCH).

4. The system of claim 3, wherein, to create the transmission schedule, the processing circuitry assigns the multiple devices a respective channel and time slot.

5. The system of claim 4, wherein a channel and time slot for a given device in the multiple devices is assigned based on a position of the given device in the second network.

6. The system of claim 5, wherein network levels on a same branch of the second network are assigned different time slots.

7. The system of claim 6, wherein a level at a first distance from the gateway device is assigned an earlier time slot than a level at a second distance, the first distance being greater than the second distance, distance being measured by counting devices to the gateway in the second network.

8. The system of claim 7, wherein a second level device aggregates transmissions from first, level devices.

9. A method for radio resource scheduling, the method comprising:
   receiving a network request at a first network interface of a gateway device, the network request including an information request to multiple devices connected to the gateway device via a second network interface;
   creating a transmission schedule for the multiple devices that is contention free;
   propagating the transmission schedule to the multiple devices;
   receiving information, responsive to the information request, from the multiple devices according to the transmission schedule; and
   fulfilling the network request with the information.

10. The method of claim 9, wherein the first network interface connects to a first network that operates in accordance with an Open Connectivity Foundation (OCF) family of standards.

11. The method of claim 9, wherein the second network interface connects to a second network that operations in accordance with an IEEE 802.15.4e family of standards that, employs time slot channel hopping (TSCH).

12. The method of claim 11, wherein creating the transmission schedule includes assigning the multiple devices a respective channel and time slot.

13. The method of claim 12, wherein a channel and time slot for a given device in the multiple devices is assigned based on a position of the given device in the second network.

14. The method of claim 13, wherein network levels on a same branch of the second network are assigned different time slots.

15. The method of claim 14, wherein a level at a first distance from the gateway device is assigned an earlier time slot than a level at a second distance, the first distance being greater than the second distance, distance being measured by counting devices to the gateway in the second network.

16. The method of claim 15, wherein a second level device aggregates transmissions from first level devices.

17. At least one non-transitory machine readable medium including instructions for radio resource scheduling, the instructions, when executed by processing circuitry, cause the processing circuitry to perform operations comprising:
receiving a network request, at a first network interface of a gateway device, the network request including an information request to multiple devices connected to the gateway device via a second network interface;
creating a transmission schedule for the multiple devices that is contention free;
propagating the transmission schedule to the multiple devices;
receiving information, responsive to the information request, from the multiple devices according to the transmission schedule; and
fulfilling the network request with the information.

18. The at least one non-transitory machine readable medium of claim 17, wherein the first network interface connects to a first network that operates in accordance with an Open Connectivity Foundation (OCF) family of standards.

19. The at least one non-transitory machine readable medium of claim 17, wherein the second network interface connects to a second network that operations in accordance with an IEEE 802.15.4e family of standards that employs time slot channel hopping (TECH).

20. The at least one non-transitory machine readable medium of claim 19, wherein creating the transmission schedule includes assigning the multiple devices a respective channel and time slot.

21. The at least one non-transitory machine readable medium of claim 20, wherein a channel and time slot for a given device in the multiple devices is assigned based on a position of the given device position in the second network.

22. The at least one non-transitory machine readable medium of claim 21, wherein network levels on a same branch of the second network are assigned different time slots.

23. The at least one non-transitory machine readable medium of claim 22, wherein a level at a first distance from the gateway device is assigned an earlier time slot than a level at a second distance, the first distance being greater than the second distance, distance being measured by counting devices to the gateway in the second network.

24. The at least one non-transitory machine readable medium of claim 23, wherein a second level device aggregates transmissions from first level devices.

* * * * *

UNITED STATES PATENT AND TRADEMARK OFFICE
CERTIFICATE OF CORRECTION

PATENT NO. : 11,219,037 B2
APPLICATION NO. : 16/608702
DATED : January 4, 2022
INVENTOR(S) : Agerstam et al.

It is certified that error appears in the above-identified patent and that said Letters Patent is hereby corrected as shown below:

In the Claims

In Column 28, Line 38, in Claim 8, delete "first," and insert --first-- therefor In Column 28, Line 59, in Claim 11, delete "that," and insert --that-- therefor In Column 29, Line 16, in Claim 17, delete "request," and insert --request-- therefor In Column 30, Line 16, in Claim 21, after "device", delete "position"

Signed and Sealed this
Twenty-fourth Day of May, 2022

Katherine Kelly Vidal
*Director of the United States Patent and Trademark Office*